United States Patent [19]

Liu

[11] Patent Number: 6,012,640
[45] Date of Patent: *Jan. 11, 2000

[54] RULE BASED AND FUZZY LOGIC METHOD AND APPARATUS FOR PROCESSING REFLECTANCE SIGNALS FROM MACHINE-READABLE SYMBOLS OR IMAGES

[75] Inventor: Lingnan Liu, Mill Creek, Wash.

[73] Assignee: Intermec IP Corporation, Beverly Hills, Calif.

[*] Notice: This patent is subject to a terminal disclaimer.

[21] Appl. No.: 08/932,857

[22] Filed: Sep. 18, 1997

Related U.S. Application Data

[63] Continuation-in-part of application No. 08/889,751, Jul. 8, 1997.
[51] Int. Cl.$^7$ ........................................... G06K 7/10
[52] U.S. Cl. ............... 235/462.25; 235/454; 235/462.26
[58] Field of Search .................. 235/462.01, 462.24, 235/462.25, 462.26, 462.27, 462.28, 462.29, 454, 494

[56] References Cited

U.S. PATENT DOCUMENTS

| | | | |
|---|---|---|---|
| 3,675,201 | 7/1972 | McKissick et al. | 340/146.3 |
| 4,143,356 | 3/1979 | Nally | 340/146.3 |
| 4,356,389 | 10/1982 | Quirey et al. | 235/455 |
| 4,401,900 | 8/1983 | Faris | 307/352 |
| 4,525,747 | 6/1985 | Sakai et al. | 358/284 |
| 4,556,916 | 12/1985 | Matsunawa | 358/282 |
| 4,856,076 | 8/1989 | Maeda | 382/53 |
| 4,998,010 | 3/1991 | Chandler et al. | 235/494 |
| 5,155,343 | 10/1992 | Chandler et al. | 235/462 |
| 5,159,340 | 10/1992 | Smith | 235/462.27 X |
| 5,189,292 | 2/1993 | Batterman et al. | 235/494 |
| 5,189,710 | 2/1993 | Holt | 382/22 |
| 5,262,626 | 11/1993 | Goren et al. | 235/462 |
| 5,276,315 | 1/1994 | Surka | 235/462 |
| 5,296,940 | 3/1994 | Kawashima | 358/455 |
| 5,311,001 | 5/1994 | Joseph et al. | 235/462 |
| 5,319,181 | 6/1994 | Shellhammer et al. | 235/462 |
| 5,389,770 | 2/1995 | Ackley | 235/462 |
| 5,402,520 | 3/1995 | Schnitta | 395/22 |
| 5,583,659 | 12/1996 | Lee et al. | 358/455 |
| 5,617,513 | 4/1997 | Schnitta | 395/50 |
| 5,777,309 | 7/1998 | Maltsev et al. | 235/454 X |
| 5,798,513 | 8/1998 | Ackley | 235/462 |
| 5,815,198 | 9/1998 | Vachtsevanos et al. | 348/88 |

*Primary Examiner*—Michael G Lee
*Attorney, Agent, or Firm*—Seed and Berry LLP

[57] ABSTRACT

A method and apparatus employs a production system-like rule based routine to process signals, such as reflectance signals produced from machine-readable symbols (e.g., bar code symbols). Relevant features data is extracted from each peak or valley in the signal, such as width, height, and relative size. The routine then uses the extracted data for each peak and valley with a set of rules to refine the reflectance signals. Under one or more iterations, the routine selects and resolves conflicting rules and applies resulting rules to process the signal. The processed signal can then be more readily decoded. The routine preferably processes a reflectance signal in portions, such as on a codeword-by-codeword basis. Under an alternative embodiment, a fuzzy inference engine provides sets of values for height, width and relative size. Therefrom rules are applied to determine a size of each peak and valley in the signal.

35 Claims, 5 Drawing Sheets

RULE BASED AND FUZZY LOGIC METHOD AND APPARATUS FOR PROCESSING REFLECTANCE SIGNALS FROM MACHINE-READABLE SYMBOLS OR IMAGES

CROSS-REFERENCE TO RELATED APPLICATION

The present application is a continuation-in-part of U.S. patent application Ser. No. 08/889,751, filed Jul. 8, 1997.

TECHNICAL FIELD

The present invention relates to a method and apparatus for analyzing waveforms produced in machine vision systems.

BACKGROUND OF THE INVENTION

Bar code scanners and wand-based readers ("readers") scan and decode typical bar codes from linear symbologies. "Linear symbologies" are symbologies where data is encoded as parallel arrangements of alternating, multiple-width bars and spaces (e.g., U.P.C., Code 39, Code 93, etc.). Linear symbologies, as well as other symbologies, encode "data characters" (i.e., human-readable characters) as "symbol characters," which are typically alternating bars and spaces. In typical linear symbologies, such as Code 39, each bar and space, or "element," in the symbol is one of four narrow and wide elements: a single-width bar, a single-width space, a double-width bar or a double-width space. More complex linear or stacked symbologies employ a greater number of widths for each element.

Bar code readers typically convert symbol characters to data characters by scanning an area to produce a reflectance signal or bar code "profile" that is generally an analog signal representing the modulated light reflected from areas of high reflectance or "spaces," and absorbed by areas of low reflectance or "bars." As a result, the profile represents the pattern of bars and spaces, or "elements," in the symbol. In a given profile, a peak corresponds to a space (high reflectivity), while a valley corresponds to a bar (low reflectivity, relative to the space). The width of each peak or valley generally indicates the width of the corresponding bar or space whose reflectance produced the peak or valley.

Many bar code readers employ "wave shaping" circuits that essentially square off the profile based on transitions or vertical edges between the peaks and valleys in the profile. Counting circuits then produce a series of counts that indicate the horizontal widths of the bars and spaces from the linear bar code symbol. A typical locating algorithm in the reader locates a bar code symbol by examining the series of counts to attempt to find a quiet zone and an adjacent start/stop symbol character. A "quiet zone" is a clear space, containing no dark marks, that precedes or follows a symbol, often next to a start or stop character. "Start and stop characters" are symbol characters, unique to a given symbology, that indicate the beginning and end of a given symbol, respectively. Typically, a quiet zone has a size that is about ten times greater than bars that precede or follow the quiet zone. Therefore, the reader examines a series of counts and attempts to find a count that is approximately ten times greater than a count which follows thereafter. Once the quiet zone and adjacent start/stop character have been located, standard decode algorithms are employed to decode series of counts from the symbol into data characters.

Wand-type readers contact the surface on which the bar code is printed. Such readers often produce profiles having sharp contrast between the peaks and valleys and thus the spaces and bars represented by the profile are easily detected by circuitry in the reader. Non-contact bar code readers are currently available such as laser scanning and linear charge-coupled device ("CCD") readers. Laser scanning-type readers employ a scanning beam of laser light which impinges on and is reflected from a bar code. A photodetector receives the reflected light and converts it into a modulated electrical signal that comprises the profile for the bar code.

Wand-based readers and laser scanners are often adequate to scan and decode linear symbologies. However, newer data collection symbologies have departed from the typical linear symbologies to create stacked or area symbologies in order to increase "information density," i.e., the amount of information encoded within a given area. "Stacked symbologies," or multi-row symbologies, employ several adjacent rows of multiple-width bars and spaces (e.g., Code 49, PDF417, etc.). "Area symbologies" or two-dimensional matrix symbologies, employ arrangements of regular polygon-shaped data cells where the center-to-center distance of adjacent data cells is uniform (e.g., MaxiCode, Code One, Data Matrix, Aztec Code, etc.).

Such stacked and area symbologies typically require image or vision-based readers that produce two-dimensional images of a field of view. Image or vision-based readers employ two-dimensional semiconductor arrays, vidicons, or other suitable light receiving elements that receive an image of a bar code and, based on the light reflected therefrom, process the image to produce the profile.

All readers produce profiles that contain noise, spurious peaks or valleys resulting from printing defects, symbol wear, etc. If such noise is insignificant enough, then the wave shaping circuits or other circuitry will appropriately square off or process the profile. Some readers employ low pass filters to filter out high frequency noise within the profile. Nevertheless, if the noise is of sufficient intensity, typical readers can simply fail to decode the profile, or incorrectly decode a given symbol.

Additional prior methods of filtering such noise employed statistics to develop a metric M. For example, such prior methods have multiplied several factors, for example, factors $F_1$ through $F_3$, for the metric $M=F_1*F_2*F_3$, or a coefficient multiplied by each factor, and the resulting products summed to produce the metric, e.g., $M=C_1F_1+C_2F_2+C_3F_3$. The resulting metric M helped instruct the reader as to how to process a given waveform or portion thereof.

The factors, however, are typically ad hoc and formulated as a probabilistic-like function ranging from zero to one. Such factors typically are optimized to or tuned for a given symbology, or to a particular noise or defect which a symbol may suffer. Additionally, such statistical methods are poor analogies to real world noise and other defects affecting symbols, and often require significant experimenting and quantitative analysis to produce such factors and coefficients. In other words, it is difficult to accurately model the real world symbol decoding process with a single metric produced from a function having one or more contributing factors. The relationship between each factor in the equation is difficult to calibrate, and no priority or ordering of factors are provided.

SUMMARY OF THE INVENTION

The inventor has discovered that certain rules can be applied to reflectance signal waveforms or profiles produced from machine readable images to reduce noise and provide a more desirable signal. In an exemplary embodiment, a data collection symbol reader initially produces a noisy profile. The reader then applies a set of rules based on four types of features to decide whether a peak or valley in the profile belongs to a bar or space or other element within the symbol. The first three features describe geometric characters of each peak or valley in a symbol character or codeword within the symbol. Specifically, they are the width, relative height, and comparative distance with respect to the maximum or minimum peak or valley for the symbol. For a flat, linear bar code symbol without large perspective angle, the symbol character length provides a good indicator to determine whether the width of a given peak or valley corresponds to an acceptable width for an element within the symbol character. The next two features measure the size of the peak or valley. All geometric measuring features help to decide if the peak or valley should be eliminated by combining it with an adjacent peak or valley. The peak or valley is too small and should be eliminated if it is too narrow or small in comparison with other peaks/valleys in the symbol. The reader employs the rules to all peaks or valleys in the profile to produce a refined or clean waveform that can be more readily decoded. The last feature is a code specific property that helps to validate a possible combination of or a sequence of adjacent peaks or valleys. For example, a combination of two neighboring peaks or valleys could create an element of seven X-dimensions wide. Such a combination, however, is not allowed by the specification of the code to be decoded, and thus the two peaks/valleys are not combined.

In an alternative embodiment, the invention uses a fuzzy logic system to measure contributing factors, such as width, relative height, and distance to the maximum/minimum peak or valley to determine whether to merge a given peak or valley with its neighbor. The fuzzy logic system uses a membership function to fuzzificate a class with linguistic variables, such as a class of peaks or valleys with variables "small," "very small," etc. The system then uses a fuzzy inference engine based on fuzzy aggregation and composition principles. Finally, the system defuzzificates the linguistic variables to determine whether a peak or valley should be combined with its neighbor. In yet another alternative embodiment, the fuzzy logic system is implemented with a rule based system where the membership function is a square function so that overlapping membership is possible. In general, an advantage of the fuzzy logic system for waveform processing is that it provides a solution to waveform analysis involving linguistic uncertainties such as "small," "very small," etc.

In a broad sense, the present invention includes a computer-implemented method for processing a noisy signal, the signal having a plurality of portions. The method includes the steps of: (a) comparing measurements from a set of the portions in the plurality of portions of the noisy signal to at least one membership function to produce a set of values for each portion in the set of portions of the noisy signal corresponding to the measurement, (b) applying at least one rule to the set of values to produce a result, and (c) adjusting at least one of the portions of the noisy signal based on the result from the at least one rule.

The present invention includes a symbol reading apparatus capable of storing a reflecting signal produced from a data collection symbol. The stored reflectance signal has a plurality of lobes representing at least peaks or valleys in this signal. A method of processing the reflectance signal in the apparatus includes the steps of: (a) selecting at least a set of lobes from the plurality of lobes, the set of lobes corresponding to a portion of the reflectance signal, (b) determining at least a first measurement with respect to at least some of the lobes in the set of lobes, (c) applying fuzzy logic processing to the first measurements of the set of lobes to produce a set of values corresponding to the first measurement for at least some of the lobes, and (d) refining the portion of the reflectance signal based on at least one formula for processing values in the set of values.

DETAILED DESCRIPTION OF THE INVENTION

A machine vision system, and in particular, an apparatus and method for locating and processing signal waveforms produced from data collection symbols or other machine-readable images, is described in detail herein. In the following description, numerous specific details are set forth such as specific linear symbols, specific methods of analyzing and processing symbol waveforms, etc., in order to provide a thorough understanding of the present invention. One skilled in the relevant art, however, will readily recognize that the present invention can be practiced without one or more of the specific details, or with other symbols, methods, etc. In other instances, well-known structures or operations are not shown in detail in order to avoid obscuring the present invention.

Figure 1:
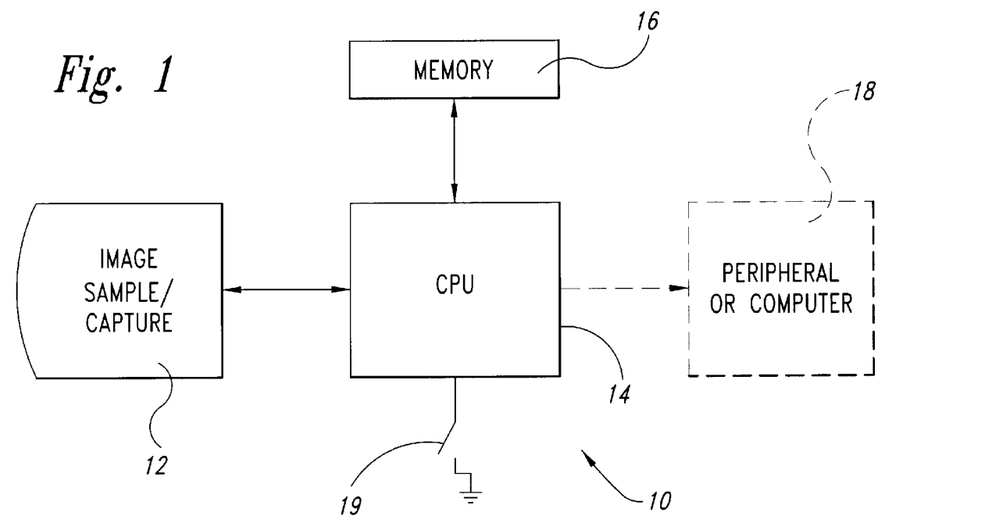
FIG. 1 is a block diagram of a data collection symbology reader of the present invention.

As shown in FIG. 1, a data collection symbology reader 10 under an embodiment of the present invention includes an image sampling or capturing device 12. As used generally herein, a "data collection symbol" refers to a symbol from any of the linear, stacked, area and other machine-readable symbologies.

In an exemplary embodiment, the image capture device 12 is an area imager that contains an array of photosensitive elements, preferably a charge-coupled device ("CCD") having, for example, a rectangular active surface of pixel elements. Other known area imagers may be used, such as vidicons, two-dimensional semiconductor arrays or a linear CCD array having mechanical means to pivot the array and provide resolution in an axis perpendicular to the linear axis of the CCD array. Additionally, other sized CCD arrays may be used, for example, circular or square CCD arrays. The rectangular pixel element array defines the field of view of the area imager. Appropriate conventional focusing optics, electronics and/or a light source (not shown) are also provided as part of the area imager.

As is known, each pixel element in the CCD array of the area imager outputs a gray level signal, i.e., an analog signal that determines the amount or intensity of light impinging upon the particular pixel element. Alternatively, each pixel element in the CCD array of the area imager can output a signal that indicates the gray intensity value of the particular pixel element. The signals output from the CCD array are similar to video data or analog signals. While the exemplary embodiment of the image sample/capture device 12 is an area imager, those skilled in the relevant art will readily recognize that other image sampling or capture devices can be employed such as laser scanners, pen-based readers, etc.

A central processing unit ("CPU") 14 receives the signals output from the area imager. The CPU 14 preferably includes an analog-to-digital converter that converts the gray level analog signals from the imager/scanner into digital signals to produce a digital image or profile. The CPU 14 also preferably includes a clock operating at a high speed so that the CPU similarly operates at a rapid rate. While the exemplary embodiment employs a single CPU 14, those skilled in the relevant art will recognize that the reader 10 can employ multiple processors that can divide tasks or routines.

A memory 16, coupled to the CPU 14, stores the digital signals output from the CPU. The memory 16 preferably includes both volatile and non-volatile memory (e.g., random access and electronically erasable read only memory). An object or image within the field of view of the area imager is converted into electrical signals that are digitized and stored in the memory 16 to be retrieved and processed by the CPU 14 under the routine described below. For example, a linear bar code symbol can be scanned and stored as a digital profile in the memory 16 for processing by the CPU 14.

After processing the stored signal, the CPU 14 can output to a peripheral apparatus or computer 18 the results of such processing. The reader 10 may be a hand-held product and include a trigger switch 19 coupled to the CPU 14. By actuating the trigger switch 19, the CPU 14 causes the image capture device 12 to provide image signals to the CPU that constitute the instantaneous image or scan within the field of view of the area imager. The specific means and method for storing an image of or scanning a symbol by the symbology reader 10 are conventional and will be understood by those skilled in the relevant art without need for further description herein.

Figures 2, 3:
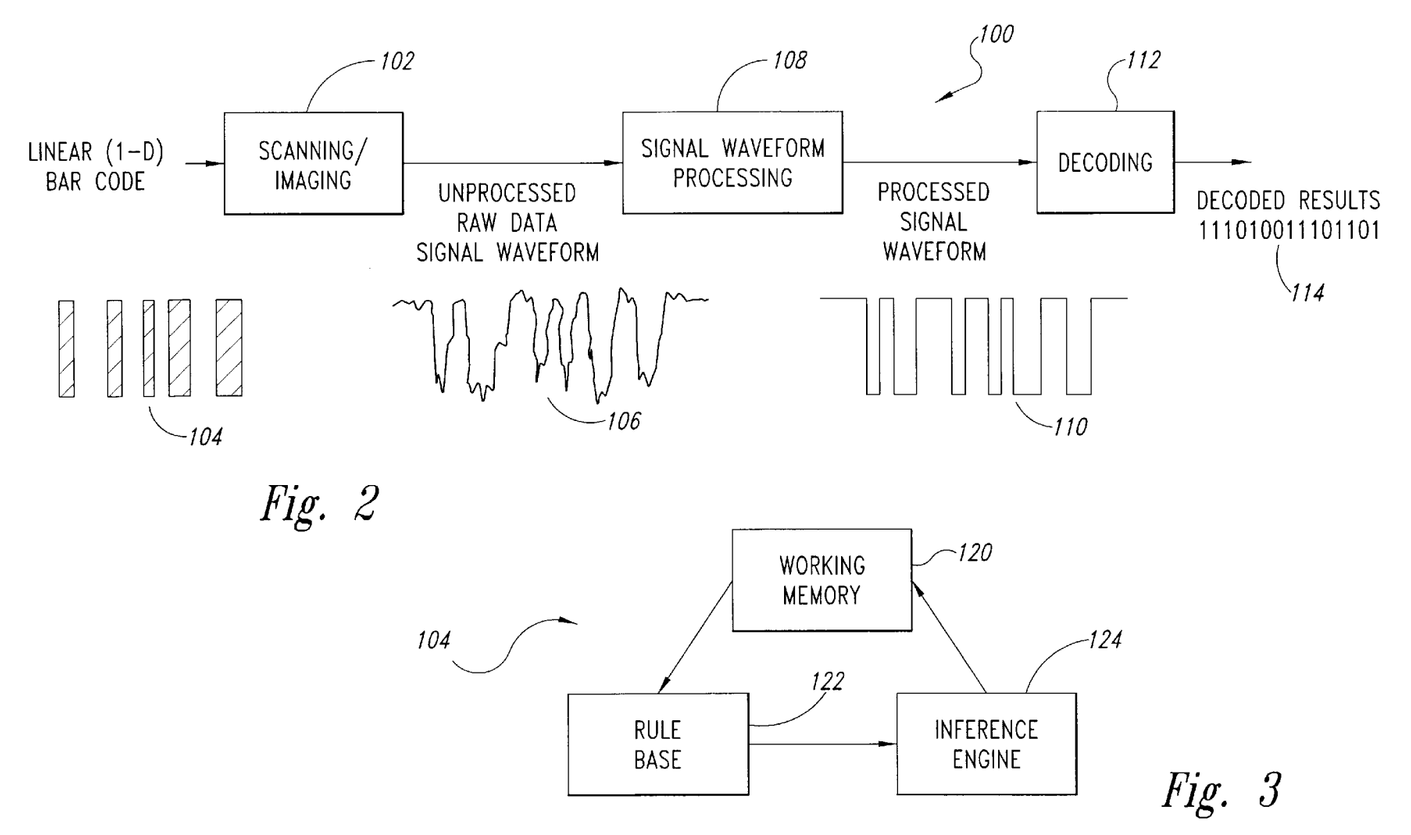
FIG. 2 is a basic block diagram of a method performed by the reader of FIG. 1, and an exemplary bar code symbol, unprocessed signal waveform produced therefrom, and a processed signal waveform produced under an embodiment of the present invention.
FIG. 3 is a basic block diagram of a method performed by the reader of FIG. 1 for processing an unprocessed signal waveform.

Referring to FIG. 2, a routine 100, executed by the CPU 14, obtains, processes and decodes a profile under the symbology reader 10. The routine 100 is preferably performed with one or more high-speed CPUs. The routine 100 can be employed within readers having two-dimensional sampling of pixels within a stored image, or within laser scanner readers, pen-based readers, and other known machine-readable symbol readers. The routine 100, and all the routines, subroutines, and methods described herein, are permanently stored within the non-volatile memory portion of the memory 16. Those skilled in the relevant art can create source code based on the flowcharts and detailed description provided herein. While the routine 100 is preferably stored in the memory 16, the routine 100 could also be formed as firmware or in hardware.

The routine 100, in sum, performs three routines to image and decode a symbol. Initially, the reader 10 in a scanning/imaging routine 102 scans or images a symbol, such as a linear bar code symbol 104. The image sample/capture device 12 and CPU 14 produce one or more signals based on light reflected from the symbol 104, and store the signals as an image or partial image of the symbol in the memory 16. The scanning/imaging step 102 produces a raw, unprocessed data signal waveform, such as a noisy waveform 106 shown in FIG. 2.

As explained herein, various methods and apparatus for receiving light reflected from the symbol and producing signals therefrom are known to those skilled in the art. Additionally, methods of scanning or imaging symbols are known to those skilled in the art. In an exemplary embodiment, the reader 10 produces an image signal representing the entire symbol and field of view of the reader, which is stored in the memory 16. As used herein, the term "stored image" generally refers to the overall image of the field of view stored in memory 16 that has been produced by the area imager and the CPU 14, and which contains an image of the symbol or symbols to be read. The CPU 14 takes one or more sampling paths through the stored image to produce a digital profile such as the signal 106, from the symbol 104.

The symbol 104, or its image stored in the memory 16, can suffer from one or more "distortions". Distortions include damage to the symbol 104, spots or voids, printing defects, optical or perspective distortions, surface distortions (e.g., when placed on a non-planar surface), resolution distortions, noise or any other defects, damage or distortions which cause the symbol or the symbol image to deviate from an ideal symbol/image. Such distortions tend to produce a noisy signal waveform, such as the waveform 106. Additionally, circuitry and other components in the reader 10 can contribute to noise within the noisy signal waveform 106.

A signal waveform processing routine 108 processes the noisy signal waveform 106 to produce a processed signal waveform, as described below. For example, the signal waveform processing routine 108 converts the noisy signal waveform 106 to a squared-off signal waveform 110, as shown in FIG. 2. A decoding routine 112 receives the processed signal waveform 110 and produces decoded results, such as a binary bit stream 114. Methods of decoding a signal waveform produced from machine-readable symbols are well known to those skilled in the art. In sum, a predetermined set of bars and spaces in the symbol 104 correspond to a symbol character, while a equal number of predetermined peaks and valleys in the processed signal waveform 110 correspond to a "codeword" for the symbol character. The codeword is subsequently decoded into a predetermined set of binary values in the string of decoded results of 114.

In an exemplary embodiment, the signal waveform processing routine 108 employs a subset of an expert system, a production system, that employs if-then sets of rules, a database of information or facts, and a rule interpreter or inference engine to match the rules or premises with the facts to form a decision. Production systems, as well as expert systems, are typically computer-implemented methods that make decisions or solve problems in a particular field. The set of rules or rule base provide specific rules about the field, and the inference engine provides the reasoning ability that enables the production system to form conclusions based on the facts and set of rules to reach conclusions that can be drawn from the facts and rules. The interference engine decides which rules have higher priority over others. The inference engine may also include a user interface or instructions as to how the expert system interacts with a user.

Referring to FIG. 3, the signal waveform processing routine 108 is shown as employing a generally cyclical process. A working memory 120 stores or includes at least two data structures. A first data structure includes an array of waveform lobes to process under the signal waveform processing routine 108. A second data structure includes a list of symbols or flags to decide a stage of decision processing of the waveform lobes.

The system or routine 104 receives the array of waveform lobes in the working memory 120, together with flags for the associated lobes. The rule base 122 stores a set of rules applicable thereto. The rules are preferably if-then statements, or conditions and subsequent action pairs. As explained below, each rule specifies a particular condition for a lobe and the action or consequences for indicating a status of the lobe or for processing the lobe satisfying this condition to thereby process the signal waveform. The working memory 120 and the rule base 122 are preferably stored in the memory 16.

An inference engine 124 receives the rules and array of waveform lobes from the rule base 122. The inference engine 124 selects which rules from the rule base 122 apply to lobes in the array of waveform lobes. The inference engine 124 then applies such selected rules to the array and changes the array and flags stored in the working memory 120. Initially, the inference engine 124 can determine that numerous rules in the rule base 122 apply to the array of waveform lobes in the working memory 120. After applying such rules, a reduced set of lobes in the array of waveform lobes can result. The same steps are performed under one or more iterations to reduce the number of rules and lobes and ultimately process the signal waveform, as described herein.

Figure 4:
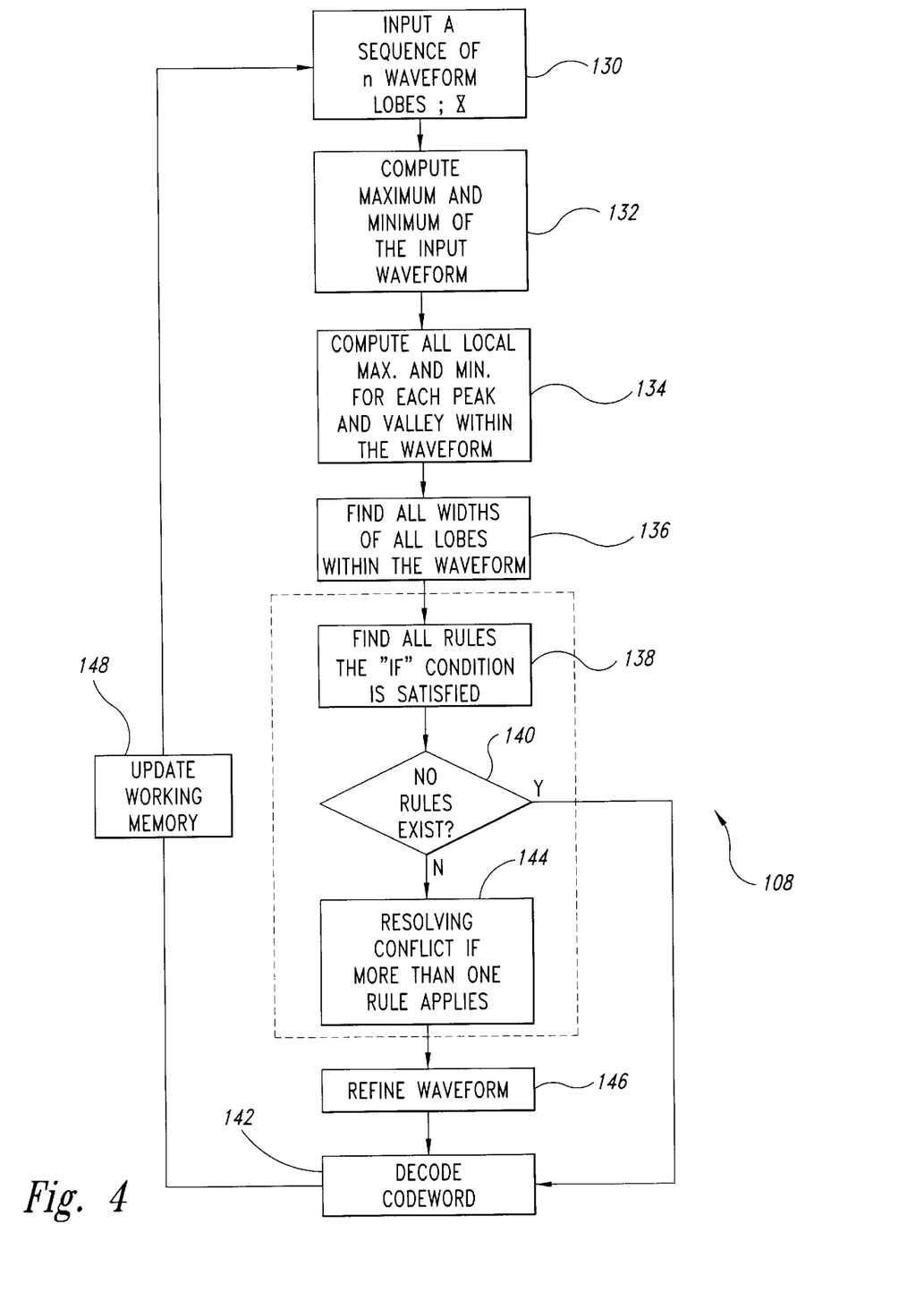
FIG. 4 is a flow diagram of an exemplary method for waveform processing performed by the reader of FIG. 1.

Referring to FIG. 4, the signal waveform processing routine 108 is shown in greater detail. The signal waveform processing routine 108 begins by first inputting or establishing an array of lobes in the unprocessed signal waveform, which is stored in the memory 16 by the CPU 14. In step 130, the CPU 14 inputs one or more waveform lobes from the array, as well as an X-dimension. In the exemplary embodiment, the CPU 14 inputs an array of lobes approximately corresponding to a symbol character or codeword, such as a series of 13 lobes. The X-dimension can be computed from a previously processed symbol character, or be established from a predetermined, stored value. The predetermined stored X-dimension can be a maximum X-dimension. In steps 132, 134, and 136, the first three features required by the rules are computed.

Figure 5:
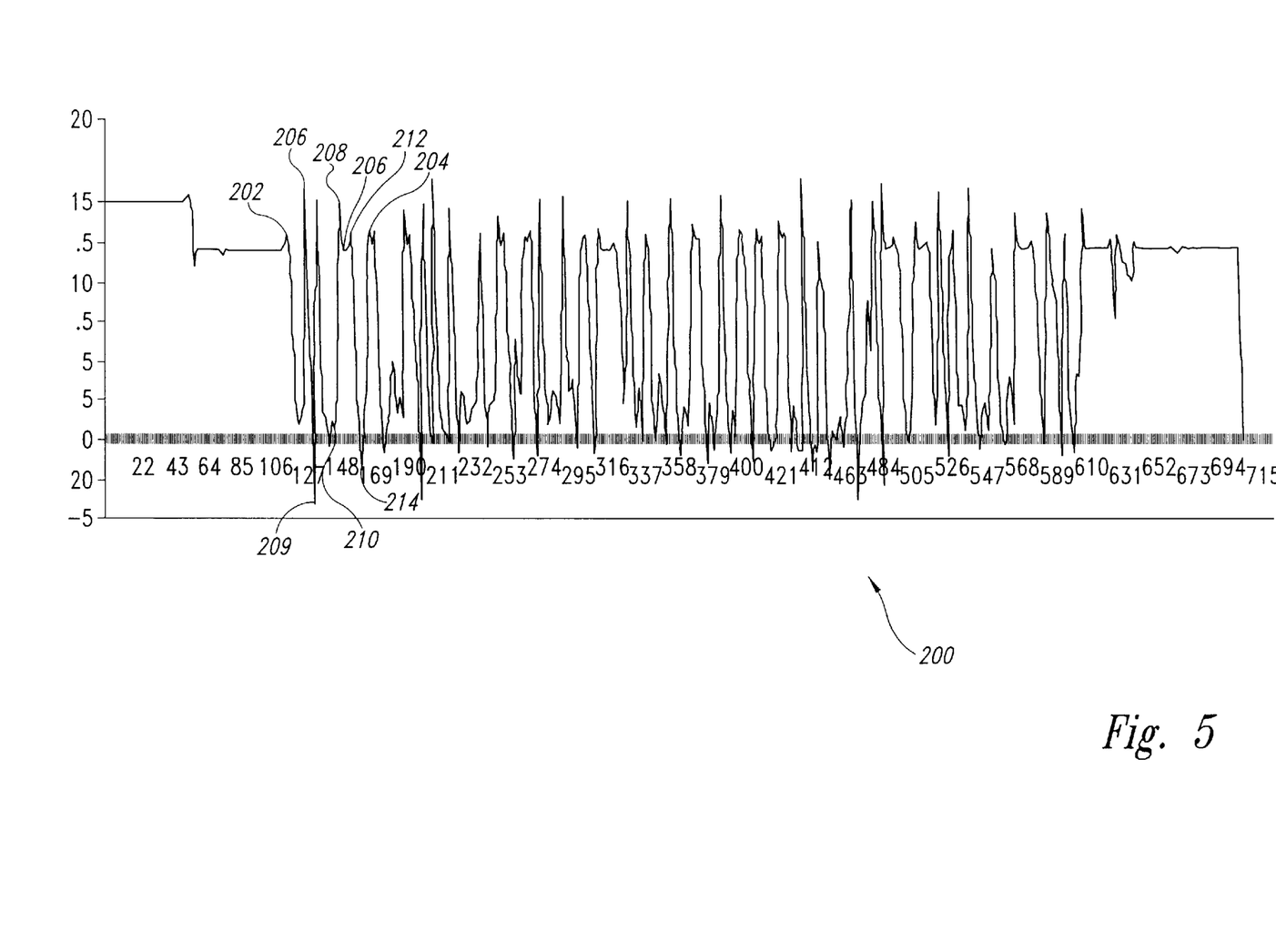
FIG. 5 is an exemplary noisy or unprocessed signal waveform produced from a linear bar code symbol.

In step 132, the CPU 14 computes maximum and minimum values for the lobes of the input waveform portion. FIG. 5 shows an exemplary or unprocessed signal waveform 200. Considering the first 13 lobes in the waveform 200, extending between a peak 202 and peak a 204, a maximum peak 206 has a value of approximately 16, while a minimum valley 208 has a value of approximately −4. Each lobe has either one peak with two neighboring valleys or one valley with two neighboring peaks. The units are arbitrary, and typically correspond to a resolution of the reader 10. In addition, the CPU 14 in step 132 determines global maximum and minimum values, which define a range of intensity values for the input set of lobes of the waveform, or for the waveform overall.

In step 134, the CPU 14 computes local maximum and minimum values of peaks and valleys for all lobes in the input waveform portion. Based on such values, the CPU 14 can determine a local size for each lobe. The difference in peak and valley values in neighboring lobes indicates the size of a lobe since an upwardly extending lobe has one peak with two neighboring valleys, and a downwardly extending lobe has one valley with two neighboring peaks. The size of a lobe is subject to its left/right neighbors.

For example, the lobe 206 in FIG. 5 has a left neighboring peak 208 having a value of approximately 15, and a right neighboring peak 212 having a value of approximately 13. The lobe 206 has a left neighboring valley 210 having a value of approximately 1 and a right neighboring valley 214 having a value of approximately −2. Therefore the size of the lobe 208 is 14 with respect to its left neighboring valley 210 (15-1). The size of the lobe 208 is 2.5 with respect to right valley 206 (15-12.5).

If the CPU 14 only processes the waveform in one direction (e.g., from left to right), then the CPU need only determine neighboring peaks and valleys in one direction (e.g., the neighboring peak and valley to the right of each lobe). The CPU 14 compares the sizes to the global minimum and maximum range of the waveform. If a size is too small compared with the range, the lobe may be a noise spike. The size relative to left or right lobes will help to determine if the noisy spike is actually a part of left or right neighboring lobes.

In step 134, the CPU 14 also computes and records the difference of the local maximum with the global maximum and that of local minimum with the global minimum. The resulting value serves as an indication of the height of an upward lobe or the "height" of a downward lobe with respect to the floor level of the input waveform portion.

Step 136, the CPU 14 determines the widths of all lobes within the input waveform portion. For example, the CPU 14 measures a width of each lobe at a predetermined distance below each peak and above each valley (e.g., distance of one of the arbitrary units of FIG. 5). Following step 136, the CPU 14 has obtained a set of three feature measurements from the input waveform portion. The CPU 14 stores the height, relative size with respect to neighbors, and width values for each lobe in the working memory 20. The CPU 14 associates each lobe in the input waveform portion with its associated height, relative size, and width, so that the CPU can later analyze each lobe separately based on predetermined rules, as described below. Based on the heights, relative size, and widths measured under steps 132, 134, and 136, respectively, the CPU 14 determines certain thresholds $T_1$, $T_2$, and $T_3$ for the input waveform portion, as described below.

In step 138, the CPU 14 finds all rules in the rule base 122 where "if" conditions of such rules are satisfied by the set of facts previously determined. The set of rules are numerous, especially with complex waveforms. Several examples of such rules stored in the rule base 122 are presented in Table 1 below.

TABLE 1

| Rule Number | Condition | Result |
| --- | --- | --- |
| P1 | If relative size of lobe is less than $T_1$ | Then size = small |
| P2 | If absolute value of height of lobe is less than $T_2$ | Then height = short |
| P3 | If width of lobe is less than $T_3$ | Then width = narrow |
| P4 | If size = small AND width = narrow AND height = short | Then action_flag = eliminate_possible |
| P5 | If action_flag = eliminate_possible AND left maximum peak is greater than current peak AND width + left_width = legal | Then combine current peak with left lobe AND action_flag = combine |
| P6 | If P5 = false AND if action_flag = eliminate_possible AND right maximum peak is greater than current peak AND width + right_width = legal | Then combine current peak with right lobe AND action_flag = combine |
| P7 | If action_flag = combine | Then refine working memory |

The value $T_1$ is a threshold relative size chosen for the set within the input waveform portion, computed by the CPU 14. It can be set as 70%–90% of the global maximum minus the global minimum. It can also be based on a certain percentage of the second greatest maximum minus the second smallest minimum (second maximum-second minimum), i.e., trim away the maximum and minimum values. For example, considering $T_1$ computed based on the input waveform portion in FIG. 5 between peaks 202 and 204, $T_1$ represents a grey level of approximately 12. Therefore, under rule P1, if the size of a current lobe is below the threshold $T_1$, then the CPU 14 establishes a magnitude flag for the current lobe in the working memory 120 to indicate that the current lobe has a small magnitude (i.e., size=small). Whether the system will consider it part of the right or left neighboring lobes depends on the side where the size measured (i.e., which direction) and other features previously determined or determined from other rules.

The value $T_2$ corresponds to a threshold of height of a lobe in the input waveform portion. It also can be set as percent of the global maximum- or global minimum. Again, the threshold $T_2$ can be established based on an average height of all peaks and valleys in the waveform, the lobes processed in a previous codeword (i.e., previous sequence of lobes), or in the current input waveform portion. The previously processed codeword will have small peaks and valleys and other noise filtered therefrom, and thus may provide an improved value. Under rule P2, if the current lobe is a valley or a peak, then the CPU 14 compares the current valley or peak to the maximum valley or maximum peak for the input waveform portion, all respectively. If the CPU 14 under rule P2 determines that the absolute value of a current lobe's height is less than the threshold $T_2$, then the CPU establishes a height flag in the working memory 120 to indicate that the current lobe is small (i.e., height=short). Likewise under rule P3, if the width of a current lobe is less than a threshold $T_3$, then the CPU establishes a width flag in the working memory 120 to indicate that the lobe is narrow. The threshold P3 can be an average of peak and valley widths in one or more previously processed codewords, the current codeword, or the signal waveform overall. In general, the CPU 14 associates one or more of the size, width and height flags with each lobe in the input sequence.

Under rule P4, the CPU 14 determines if the relative size, width and height flags in the working memory 120 correspond to small, narrow and short values, respectively. If so, then the CPU 14 establishes an action flag in the working memory 120 to indicate that the current lobe should possibly be part of an adjacent lobe (i.e., action_flag=eliminate-possible).

Under rules P5 and P6, the CPU 14 determines whether to combine a current lobe with adjacent lobes. Under rule P5, the CPU 14 determines that if the combine flag equals possible and the left neighboring maximum peak is greater than the current upward lobe, then combine the current lobe with the left lobe. Additionally, under rule P5, the CPU 14 determines whether the resulting width after combining the current upward lobe with the left lobe will produce a lobe or element that is greater than that permissible under the symbology of the symbol (i.e., width+left_width=legal). Similarly, under rule P6, if P5 fails, and the combine flag equals possible and the right neighboring maximum peak is greater than the current lobe, and the possible combination would not generate a big bar lobe that results in an illegal bar code, then combine the current lobe with the right lobe.

Figure 6:
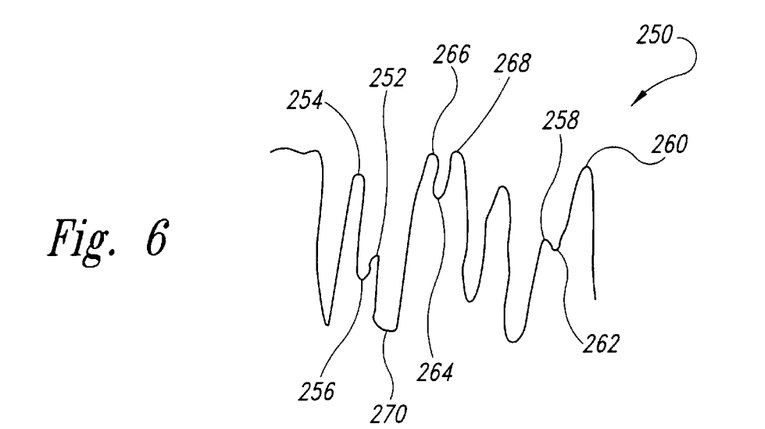
FIG. 6 is a schematic diagram of a portion of an unprocessed signal waveform.
Figure 7:
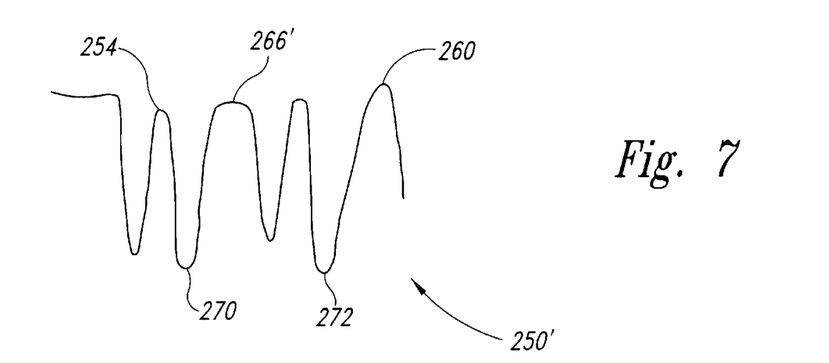
FIG. 7 is an exemplary diagram of a processed signal waveform produced from the signal waveform portion of FIG. 6 under the embodiment of the present invention.

Referring to FIG. 6, a schematic waveform portion 250 includes a small peak 252 having a greater left neighboring peak 254, separated by a small valley 256. Under rule P5, the CPU 14 determines that if the combine flag equals possible, and since the left maximum peak 254 is greater than the current peak 252, the CPU combines the peak 252 with the left neighboring peak 254. As shown in FIG. 7, a resulting processed waveform portion 250' includes only the peak 254 and right neighboring valley 270, without the small peak and valley 252 and 256. Under rule P6, the CPU 14 similarly merges the small peak 258 with the right neighboring peak 260 in the waveform 250, to produce the single peak 260, left of a valley 272, as shown in the waveform 250' of FIG. 7.

Under rule P7, the CPU 14 updates relevant flags and other data stored in the working memory 120. For example, the CPU 14 deletes the current lobe in the array of lobes, deletes any entry as a peak or valley in list of peaks and valleys (such as determined under step 134), refines the list of widths, adjusts any averaged or threshold values (e.g. values $T_1$, $T_2$ and $T_3$), etc.

Only seven exemplary rules are presented in Table 1 above. Various other rules and associated flags are possible under the routine 108. For example, additional rules are necessary to determine whether an identified small lobe or "spike" should be combined with the lobe to the left or to the right of the spike. If the spike has a small relative size with respect to its neighbors, but is far from one of the global maximums or minimums, then the spike can be combined with either the left or the right lobe. For example, if the spike is upwardly extending, and is far from the global minimum, it can be combined with either the left or right lobes. However, if the spike is positioned between the global minimum and maximum values, then additional rules are necessary. If the spike is closer to the global minimum, then it should be combined with a neighboring valley, while if the spike is closer to the global maximum, it should be combined with a neighboring peak. Of course, the resulting lobe must be permissible or legal for the particular symbology or symbol.

Various other rules may be required under the routine 108 for a particular symbology and a particular level of desired waveform processing. Rules for combining left or right neighbors with current downwardly extending lobes are not shown. For example, additional rules can identify an element or combine a small valley 264 in the waveform portion 250 of FIG. 6, to merge it with adjacent peaks 266 and 268, and thereby produce the single peak 266' in FIG. 7. Additional rules can include whether a given lobe is invalid as compared to the X-dimension of various symbologies (e.g., the lobe, if combined with an adjacent lobe, would result in a symbol element greater than that allowable under the symbology).

In general, the rules employed under the routine 108 can be placed into at least three categories. A first category of rules identifies noise spikes and other undesirable lobes or errors in the waveform. A second category of rules determines how to process such identified undesirable lobes, such as combining them with left or right lobes. A third category of rules determines whether a proposed processing of an undesirable lobe is legal or acceptable, such as producing a lobe that has an acceptable X-dimension for the symbol, or producing a symbol character having a legal number of elements or modules. The rules of the third category are specific to features of a given symbology or application. Those skilled in the relevant art can readily develop additional rules for a given symbology and application based on the detailed description provided herein.

Referring back to FIG. 4, the CPU 14 in step 140 determines whether any rules are satisfied under step 138. If not, then the CPU 14 determines that all lobes in the current sequence are acceptable. Therefore, in step 142, the CPU 14 attempts to decode the current codeword.

If the CPU 14 determines in step 140 that one or more rules apply, then in step 144, the CPU resolves any conflicts between rules. In general, the CPU 14 employs rule selection criteria that prioritizes rules, to thereby permit the CPU to select one rule over another. Table 2 below presents several exemplary rule selection criteria, and priorities for such criteria.

TABLE 2

| Priorities | Rules Selection Criteria |
| --- | --- |
| First | Use rules employing width conditions |
| Second | Use rules with size conditions |
| Third | Choose first of several rules that apply |

The rule selection criteria in Table 2 indicate that rules employing width conditions have dominant or first priority, and rules having range conditions have second priority. A third priority suggests that if any two rules apply, the first identified rule is to be chosen. For example, if one height condition rule and two width condition rules apply, then under the first rule selection criteria, the CPU 14 employs the two width condition rules (e.g., rule P3 and another width rule). Thereafter, under the third rule selection criteria, the CPU 14 employs the first of two width condition rules (e.g., rule P3). Of course, other rule selection criteria are possible. Additionally, under step 144, the CPU 14 eliminates secondary reasoning. In step 144, the CPU 14 also compares results under one rule to remaining rules in the rule base 122. For example, the CPU 14 may determine that combining the current lobe with an adjacent lobe under one rule would produce a resulting lobe having an X-dimension greater than a threshold X-dimension under another rule, and therefore the CPU ignores the one rule.

In general, the CPU 14 in step 144 eliminates one or more rules that were determined to apply under previous step 138. After eliminating one or more rules, the routine 108 loops back to perform steps 138, 140 and 144 under one or more iterations to reduce the number of rules which apply to the input waveform portion. After one or more iterations, the CPU 14 in step 144 determines that no rules conflict with each other. Therefore, in step 146, the CPU 14 applies the resulting rules to refine the input waveform portion. For example, the CPU 14 refines the waveform 250 of FIG. 6 to produce the resulting waveform portion 250' of FIG. 7. Thereafter, the CPU in step 142 attempts to decode the resulting, refined waveform portion as a codeword.

Following step 142, the CPU 14 in step 148 updates the working memory 120. As noted herein, certain variables or thresholds depend on averages or values computed from previous codewords. The CPU 14 also clears certain flags, such as the height, width and magnitude flags. Thereafter, the CPU 14 repeats steps 130–148 as the CPU attempts to refine input waveform portion and/or decode the next codeword. After processing all codewords in the signal waveform, the routine 108 ends. The resulting processed signal waveform is then decoded by the CPU 14 using known methods. For example, the processed signal waveform is then readily squared off to produce a square wave-like signal, which is subsequently decoded into data characters previously encoded in the symbol characters.

In an alternative embodiment, the inference engine 124 of FIG. 3 is replaced with a fuzzy inference engine, and the rule base 122 is replaced with a stored table of rules. The fuzzy inference engine provides a good mathematical model to represent human decision and evaluation processes in an algorithmic form, particularly with linguistic processes. For example, a small lobe adjacent to a large lobe can be seen and linguistically understood by a human evaluator as requiring the small lobe to be merged with the adjacent large lobe. However, the terms "small" and "large" are "fuzzy" concepts in that there is linguistic uncertainty within the definitions of such words.

Fuzzy logic models compensate for such linguistic uncertainty. For example, a lobe is "small" when it is short in height, close to the floor or ceiling (minimum or maximum) and narrow in width. The fuzzy inference engine provides a degree or level of confidence for a lobe's height, distance to the ceiling/floor and width, as explained below. In general, measurements taken from a waveform at a technical level are fuzzified to a linguistical level to attach linguistic variables to features (e.g., lobes) within the waveform. The fuzzy inference engine analyzes such linguistic variables to provide a degree for each linguistic variable. Thereafter, a defuzzification process is performed to determine whether aspects in the waveform are to be merged or otherwise filtered.

Figure 8A:
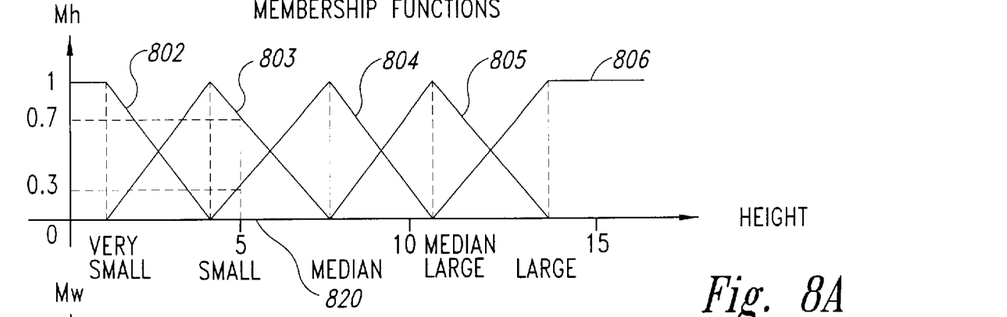
FIG. 8A shows exemplary membership function curves for linguistic height variables very small, small, median, median large and large.

An initial step in providing fuzzification under the alternative embodiment is to develop membership functions or curves defining linguistic variables. As shown in FIG. 8A, a series of five curves 802–806 define five linguistic height variables "very_small," "small," "median," "median_large," and "large," respectively. The x-axis defines arbitrary units of height, such as a value between 0 and 15 (based on, e.g., a grey scale value), while the y-axis defines a membership value or confidence level between 0 and 1. A lobe is considered "very_small" with a very high likelihood (approximately 1) at a value of 1 or less on the x-axis, as shown by the curve 802. From the values 1 to 4 on the x-axis, the curve 802 slopes downwardly to a 0 value, and remains 0 thereafter. The curve 803 indicates that a lobe is "small" at a confidence level or degree of 1 at a value of 4, but slopes to 0 at values 1 and 8. Likewise, the curve 804 defines a "median" lobe at a confidence level of 1 at a value of 8, the curve 805 defines a "median_large" lobe at a confidence level of 1 at a value of 11, and the curve 806 defines a "large" lobe at a confidence level of 1 at a value of 14 or greater. The curves 803, 804, and 805 provide peaks which provide a highest level of confidence for a given value for the linguistic variables "small," "median," "median_ large," and drop the 0 in opposite directions therefrom.

Figure 8B:
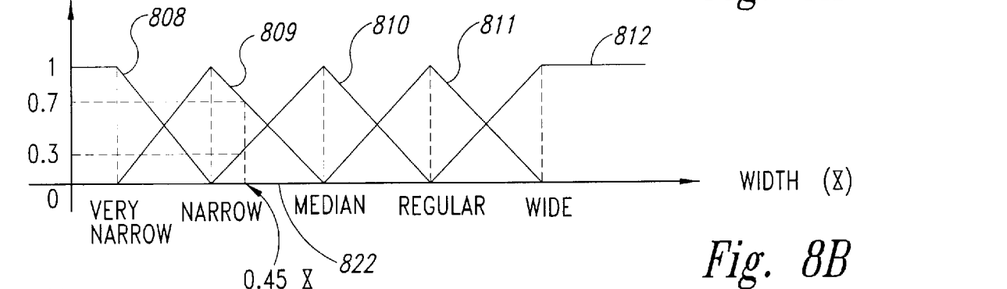
FIG. 8B shows exemplary membership function curves for linguistic width variables very narrow, narrow, median, regular and wide.
Figure 8C:
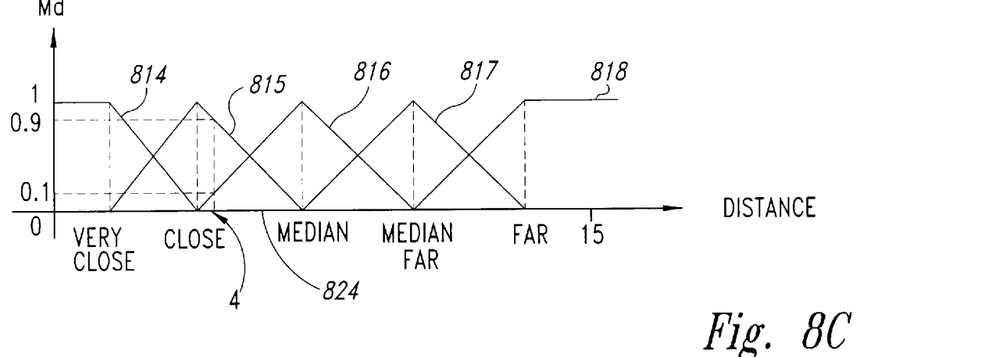
FIG. 8C shows exemplary membership function curves for linguistic distance variables very close, close, median, median far and far.

As shown in FIG. 8B, a similar set of five curves 808–812 define five curves for linguistic width variables "very_ narrow," "narrow," "median," "regular," and "wide," respectively. Again, the y-axis defines a confidence level between 0 and 1, while the x-axis defines a width in x dimensions. The curves 808–812 are similar to the curves 802–806. Likewise, as shown in FIG. 8C, five curves 814–818 define linguistic variables "very_close," "close," "median," "median_far," and "far," respectively, for the distance a lobe is from the minimum/maximum levels. Again, the x-axis represents intensity levels from values 0 to 15, while the y-axis represents confidence levels between 0 and 1.

The curves of FIGS. 8A–8C are linear, and therefore can be readily processed by the CPU 14. However, curves or other membership functions for defining linguistic variables can be nonlinear, or employ other more complex functions than the curves shown in FIGS. 8A–8C. In general, membership functions can be derived based on empirical data input to spreadsheets using known numerical analysis techniques to generate optimized membership functions. In sum, one can determine through experimentation appropriate membership functions for assigning confidence values between 0 and 1 for linguistic variables that define features in a waveform.

An inference processing routine under the alternative embodiment is similar to the routine 108 of FIG. 4. The CPU 14 still measures heights, relative size, and widths of lobes in the waveform under steps 132–136. In addition, however, the CPU 14 also compares the measured heights, widths, and relative sizes (distances) to the membership functions or curves of FIGS. 8A, 8B, and 8C, respectively. For each lobe, the CPU 14 thus produces a set of confidence levels or degrees for each of the five linguistic variables in each membership function.

For example, an exemplary lobe (not shown) has a height equal to five (as shown by the point 820 in FIG. 8A), a width equal to 0.45×dimensions (shown by the point 822 of FIG. 8B), and a relative height of four (as shown by the point 824 in FIG. 8C). Based on each of the three measured values for the exemplary lobe, the CPU 14 generates a set of five confidence values associated therewith. For example, a height measurement will have associated therewith a set of five confidence values indicating a degree of confidence associated with each of the linguistic height variables of "very_small," "small," "median," "median_large," and "large."

As shown in FIG. 8A, the exemplary lobe with the measured height of five intersects the curve 803 at a confidence level of 0.7, and the curve 804 at a confidence level of 0.3. The measured height of five for the exemplary lobe does not intersect any of the other curves, and therefore the linguistic variables associated with those curves have a confidence level of 0. The set of five values associated with the measured height of five is then: very_small=0, small= 0.7, median=0.3, median_large=0, and large=0. In sum, the CPU 14 determines a set of five variables for the measured height of five for the exemplary lobe as:

$$\{0, 0.7, 0.3, 0, 0\},$$

where the position of each value in the set corresponds to its associated linguistic variable (i.e., the first value in the set corresponds to "very_small," while the fifth value corresponds to "large").

As shown in FIG. 8B, the measured width of 0.45× intersects the curve 809 at a confidence level of 0.7, and the curve 810 at a confidence level of 0.3. Therefore, the CPU 14 determines a set of five width values for the measured width 0.45× of: very_narrow=0, narrow=0.7, median=0.3, regular=0, and wide=0 (i.e., {0, 0.7, 0.3, 0, 0}). Likewise, as shown in FIG. 8C, the measured distance of four in the exemplary lobe intersects the curve 815 at a confidence level of 0.9, and the curve 816 at a confidence level of 0.1. Therefore, the CPU 14 generates a set of five values for the measured distance of four of: very_close=0, close=0.9, median=0.1, median_far=0, and far=0 (i.e., {0, 0.9, 0.1, 0, 0}). In sum, the CPU 14 generates the three sets of values for the linguistic variables height, width and relative height (distance) as follows:

Height: {0, 0.7, 0.3, 0, 0},

Width: {0, 0.7, 0.3, 0, 0}, and

Distance: {0, 0.9, 0.1, 0, 0}.

Following the steps 132–136, the CPU 14 under the alternative embodiment has developed three sets, height, width, and distance, for each lobe, where each set includes five values. Thereafter, in steps 138–148, the CPU 14 identifies and applies rules to the measured lobes. The rules, such as if-then type statements or formulas, help further define a lobe. For example, one set of rules is employed by the CPU 14 to determine a size of a given lobe. For example, the CPU 14 employs the three sets of height, width and distance values to determine confidence levels for linguistic size variables "very small," "small," "median small," "median," "large" and "very large." An exemplary set of four rules is presented below.

Rules

1. If Width is "narrow" AND Distance is "close", then Size is "median_small."
2. If Width is "very_narrow" AND Distance is "very close," then Size is "very small."
3. If Height is "median" OR "median_large" AND Width is "median" OR "regular" OR "wide" AND Distance is NOT "far," then Size is "median."
4. If Height is "median large" AND Width is "regular" OR "large" AND Distance is "far," then Size is "large."

Fuzzy logic operators apply to such rules. An "AND" operator corresponds to conjunction or intersection, wherein a minimum value in the set of values is selected:

$$\text{AND: } \mu_{A\cap B} = \min\{\mu_A, \mu_B\}$$

Conversely, the logical operator "OR" corresponds to disjunction or union, wherein a maximum value in a set of values is selected:

$$\text{OR: } \mu_{A\cup B} = \max\{\mu_A, \mu_B\}$$

The logical "NOT" operator corresponds to a value of 1 minus the confidence level:

$$\text{NOT: } \mu_{z,900\ A} = 1 - \mu_A$$

The CPU 14 then applies the rules in the rule table for the set of measured values of each lobe.

Considering the exemplary lobe, the CPU 14 under rule 1 first selects the "narrow" width value (i.e., 0.7) and the "close" distance value (i.e., 0.9) in the width and distance sets above. The logical AND operator corresponds to selecting a minimum from these values, therefore, the CPU 14 selects the value 0.7. Consequently, the CPU 14 determines under rule 1 that the size of the exemplary lobe is "median_small" with a degree of confidence of 0.7.

Applying rule 2, the CPU 14 selects the "very_narrow" value in the width set (i.e., 0), and the "very_close" value in the distance set (i.e., 0). The AND operator corresponds to selecting the minimum of these two values, therefore, the CPU selects the value 0. Consequently, the CPU 14 determines under rule 2 that the size of the exemplary lobe is very_small to the degree of 0.

In general, with a string of logical operations, "OR" operations are performed before "AND" operations. Thus, under rule 3, the CPU 14 first performs the logical OR operations. The CPU 14 selects "median" and "median_large" values in the height set (i.e., 0.3 and 0) and determines a maximum of these values based on the logical OR operation, that is, 0.3. Similarly, the CPU 14 determines a maximum of the "median," "regular," and "wide" values in the width set (i.e., 0.3, 0, and 0) and determines a maximum therefrom, that is, 0.3. The CPU 14 also performs the logical NOT operation for the "far" value in the distance set, that is, 1−0=1. Thereafter, the CPU 14 determines the logical AND operation for the three determined values, i.e., 0.3, 0.3, and 1, or in other words, selects a minimum from these values. A minimum of these three values is 0.3, and therefore the CPU 14 determines that the size is "median" to the degree of confidence of 0.3.

Applying rule 4, the CPU 14 first determines a maximum of the "regular" and "large" width values (maximum of (0, 0)=0). Thereafter, the CPU 14 determines a minimum of the "median large" height value, the maximum selected width, and the "far" distance value (i.e., min (0, 0, 0)=0). Therefore, the CPU 14 determines that the size is large to the degree of 0.

Figure 9:
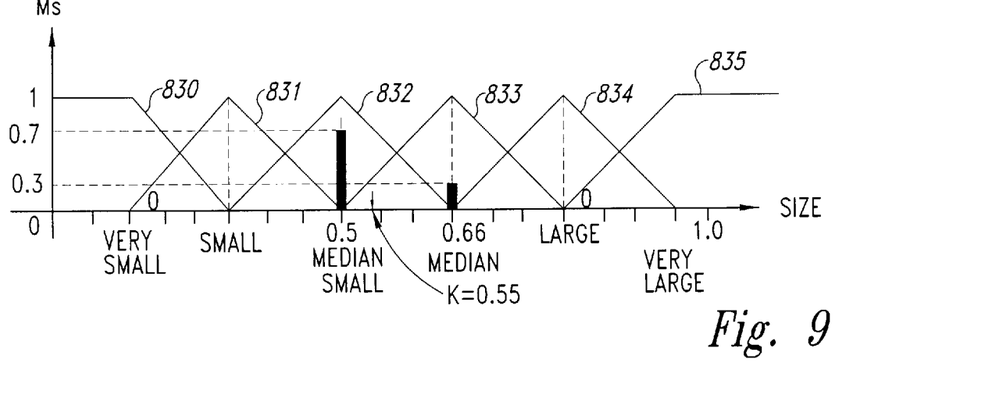
FIG. 9 shows exemplary membership function curves for linguistic size variables very small, small, median small, median, large and very large.

Of course, the CPU 14 can employ other rules. In general, those skilled in the relative art can develop rules for the CPU 14 to analyze the sets of values in the height, width and distance sets and assign linguistic size variables to lobes in the waveform. Thereafter, the CPU 14 determines measurements for the lobes. In the above example, the CPU 14 applies the set of rules to the three sets of measured values to determine a size for the exemplary lobe under a size membership function. In sum, the measured size provides a composition of the aggregated height, width and distance measurements. As shown in FIG. 9, an exemplary series of six curves 830–835 determine a size of a measured lobe. The curves 830–835 define the linguistic size variables "very_small," "small," "median_small," "median," "large" and "very_large." The curves of FIG. 9 are similar to the curves of FIG. 8A. The x-axis represents arbitrary values, such as values between 0 and 1, with "median_small" corresponding to 0.5 and "very_large" corresponding to 1.0. Of course, other curves or membership functions can be employed to represent a size of a lobe.

Based on the curves of FIG. 9, the resulting size determinations for "median small," "very small," "median" and "large" under rules 1–4, respectively, are plotted on the curves of FIG. 9. Multiplying the size measurements times the previously computed size values under the above rules produces a computed size for a given lobe. For example, the measured size of the exemplary lobe corresponds to:

size measure=(0×very_small)+(0.7×median_small)+(0.3×median)+(0×large)=k.

The "median_small" value corresponds to 0.5, while the "median" value corresponds to 0.66. Therefore, the measured size corresponds to (0.7×0.5)+(0.3×0.66)=0.55=k. The measured size for the exemplary lobe k is shown in FIG. 9.

Once a size for each lobe is determined by the CPU 14, the CPU applies additional rules to determine whether to merge the current lobe with an adjacent lobe. For example, if the size of the lobe is less than a threshold value (e.g., less than 0.45), then the CPU merges the lobe with the largest lobe neighbor. The exemplary lobe is greater than 0.45, and therefore, the CPU 14 determines not to merge the lobe with an adjacent lobe. If the CPU 14 determines that a lobe is to be merged with its neighbor, the CPU still determines whether such a merging is acceptable, as noted above under step 144. Thereafter, the CPU 14 under the alternative embodiment does not loop through steps 138–144, but instead simply refines the waveform in step 146 and attempts to decode the codeword in step 142. Thereafter, the process repeats under the alternative embodiment, wherein the CPU 14 refines a waveform based on a codeword-by-codeword basis, in order to refine and decode the entire waveform.

Rather than a standard microprocessor or microcontroller for the CPU 14, the reader 10 can employ a fuzzy processor in addition to, or in lieu of, the CPU 14 (e.g., a digital signal processor (DSP)). While the alternative embodiment is described above as analyzing lobes in the reflecting signal, the alternative embodiment can be employed to adjust portions in a noisy signal, not necessarily peaks or valleys in the signal. Under the alternative embodiment, the reader 10 applies fuzzy logic processing to measurements of lobes or other portions in the signal to produce a set of values corresponding to the measurement, such as the set of height, width and distance values for the lobes. Based on these set of values, the reader 10 refines at least a portion of the signal based on at least one formula or rule for processing values in the set of values.

Although specific embodiments of, and examples for, the present invention are described herein for illustrative purposes, various equivalent modifications are possible within the scope of the invention, as will be recognized by those skilled in the relevant art. The teachings provided herein of the present invention can be applied to other machine vision systems, not necessarily the exemplary data collection symbology reader described above. Various exemplary distortion and noise compensating rules, and accordingly, various other routines, etc., can be employed under the present invention and a greater or lesser number of rules can be employed.

Aspects of the present invention can be applied to not only reading machine-readable symbols and other images, but also to printing such images. For example, in an alternative embodiment, the present invention can adjust the quality of printing by first defining features of quality. Therefrom, rules are developed for such quality features and the results of a signal or images satisfying such rules.

All of the above U.S. patents and applications are incorporated herein by reference as if set forth in their entirety. While the present invention identifies an image of a data collection symbol, the present invention can similarly read visual indicia of other stored images.

These and other changes can be made to the invention in light of the above detailed description. In general, in the following claims, the terms used should not be construed to limit the invention to the specific embodiments disclosed in the specification and the claims, but should be construed to include all machine vision systems that operate under the claims to provide a method for accurately locating visual indicia. Accordingly, the invention is not limited by the disclosure, but instead its scope is to be determined entirely by the following claims.

What is claimed is:

1. In a symbol reading apparatus capable of storing a reflectance signal produced from a data collection symbol, the stored reflectance signal having a plurality of lobes representing peaks and valleys in the signal, a method of processing and decoding the reflectance signal comprising:

selecting at least a set of lobes from the plurality of lobes, the set of lobes corresponding to a portion of the reflectance signal;

determining at least a first measurement with respect to at least some of the lobes in the set of lobes;

comparing the first measurement of the first set of lobes to at least one membership function to produce a set of values for each lobe corresponding to the first measurement, wherein the membership function provides greater than two possible values for each lobe and wherein the set of values includes at least two confidence values for at least some of the lobes;

applying at least one rule to the set of values and refining the portion of the reflectance signal based on the rule; and decoding the portion of the reflectance signal.

2. The method of claim 1 wherein applying includes identifying and selecting at least one rule selected from a plurality of rules.

3. The method of claim 1 wherein determining includes determining a height of each lobe in the set of lobes, determining the relative distance of each lobe in the set of lobes from minimum and maximum values, and determining a width of each lobe in the set of lobes; and wherein comparing includes producing for each lobe a set of height, width and distance values.

4. The method of claim 1 wherein applying includes combining at least one of the lobes with an adjacent lobe in the set of lobes.

5. The method of claim 1 wherein applying includes combining at least one of the lobes with an adjacent lobe in the set of lobes if a resulting combined lobe is a valid element width based on an X-dimension size of the data collection symbol.

6. The method of claim 1 wherein decoding includes decoding a codeword in the reflectance signal, and wherein the method includes repeating the selecting, determining, comparing, applying and decoding for each codeword in the reflectance signal.

7. The method of claim 1 wherein comparing includes comparing the set of lobes to a series of curves to derive degrees of confidence, and wherein the degrees of confidence correspond to linguistic height or width variables.

8. The method of claim 1 wherein applying includes identifying a plurality of conditional rules and corresponding results in a rule base that apply to at least one lobe in the set of lobes.

9. A computer-implemented method of processing a noisy data collection signal, the data collection signal having a plurality of portions, the method comprising:

comparing measurements from a set of the portions in the plurality of portions of the noisy data collection signal to at least one membership function to produce a set of values corresponding to the measurement for each portion in the set of portions of the noisy data collection signal, wherein the membership function provides greater than two possible values for each lobe, and wherein the set of values includes at least two confidence values for at least some of the lobes;

applying at least one rule to the set of values to produce a result; and adjusting at least one of the portions of the noisy data collection signal based on the result from the at least one rule.

10. The method of claim 9 wherein applying includes identifying and selecting at least one rule selected from a plurality of rules.

11. The method of claim 9 wherein comparing includes determining a height of each portion in the set of portions, and determining a width of each portion in the set of portions in the noisy data collection signal; and wherein comparing includes producing for each portion a set of height and width values.

12. The method of claim 9 wherein adjusting includes combining at least one of the portions with an adjacent portion in the set of portions of the noisy data collection signal.

13. The method of claim 9 wherein decoding includes decoding a segment of the data collection signal, and wherein the method includes repeating the comparing, applying and adjusting for each segment of the data collection signal.

14. The method of claim 9 wherein comparing includes comparing the set of portions in the noisy data collection signal to a series of curves to derive confidence values.

15. The method of claim 9 wherein adjusting includes combining at least one of the portions with an adjacent portion in the set of portions of the noisy data collection signal if a resulting combined portion is acceptable as compared to a predetermined rule.

16. The method of claim 9 wherein the noisy data collection signal corresponds to a signal produced from a machine-readable symbol, and wherein adjusting includes determining whether an adjusted segment of the signal is acceptable as compared to a predetermined rule, and wherein the predetermined rule corresponds to a feature of symbology of the machine-readable symbol.

17. The method of claim 9, further comprising producing the noisy data collection signal based on light reflected from a data collection symbol.

18. An apparatus for processing a signal produced from machine-readable visual indicia, the apparatus comprising:

an image sensor that receives light reflected from the machine-readable visual indicia and produces a reflectance signal therefrom that represents at least a portion of the machine-readable visual indicia, wherein the signal has a plurality of lobes corresponding to peaks and valleys in the signal; and at least one fuzzy logic processor coupled to the image sensor that measures at least a set of lobes in the plurality of lobes, compares measurements from the set of lobes in the signal to at least one membership function to produce a set of values corresponding to the measurement, applies at least one rule to the set of values to produce a result, and adjusts at least a portion of the signal based on the result from the at least one rule, wherein the membership function provides greater than two possible values for each lobe, and wherein the set of values includes at least two confidence values for at least some of the lobes.

19. The apparatus of claim 18 wherein the fuzzy logic processor repeatedly identifies rules from a set of rules for the set of lobes to produce at least one selected rule applicable to one lobe in the set of lobes.

20. The apparatus of claim 18 wherein the fuzzy logic processor is configured to the set of lobes to a series of curves to derive confidence values.

21. The apparatus of claim 18 wherein the fuzzy logic processor is configured to combine at least one of the lobes with an adjacent lobe in the set of lobes if a resulting combined lobe is acceptable as compared to a predetermined rule.

22. The apparatus of claim 18 wherein the fuzzy logic processor measures a height of each lobe in the set of lobes and measures a width of each lobe in the set of lobes, and produces sets of height and widths values for each lobe.

23. The apparatus of claim 18 wherein the fuzzy logic processor combines at least one of the lobes with an adjacent lobe in the set of lobes.

24. The apparatus of claim 18 wherein the processor decodes a portion in the signal, and repeatedly measures, compares, applies, adjusts and decodes individual portions of the signal.

25. A computer-readable medium storing a signal processing application program for performing a method for filtering a data collection signal, wherein the method comprises:

receiving a data collection signal having a plurality of lobes corresponding to peaks and valleys in the signal;

comparing measurements from a set of lobes in the plurality of lobes to at least one membership function to produce a set of values corresponding to the measurement for each lobe in the set of lobes, wherein the membership function provides a range of possible values for each lobe, and wherein the set of values includes at least two confidence values for at least some of the lobes;

applying at least one rule to the set of values to produce a result; and adjusting at least a portion of the data collection signal based on the result from the at least one rule.

26. The computer-readable medium of claim 25 wherein comparing includes determining a height of each lobe in the set of lobes, and determining a width of each lobe in the set of lobes; and wherein comparing includes producing for each lobe a set of height and width values.

27. The computer-readable medium of claim 25 wherein adjusting includes combining at least one of the lobes with an adjacent lobe in the set of lobes.

28. The computer-readable medium of claim 25 wherein comparing includes comparing the set of lobes to a series of curves to derive confidence values.

29. The computer-readable medium of claim 25 wherein adjusting includes combining at least one of the lobes with an adjacent lobe in the set of lobes if a resulting combined lobe is acceptable as compared to a predetermined rule.

30. The computer-readable medium of claim 25 wherein receiving includes receiving a data collection signal based on light reflected from a data collection symbol.

31. In a symbol reading apparatus capable of storing a reflectance signal produced from a data collection symbol, the stored reflectance signal having a plurality of lobes representing at least peaks or valleys in the signal, a method of processing the reflectance signal in the apparatus comprising:

selecting at least a set of lobes from the plurality of lobes, the set of lobes corresponding to a portion of the reflectance signal;

determining at least a first measurement with respect to at least some of the lobes in the set of lobes;

applying fuzzy logic processing to the first measurement of the set of lobes to produce a set of confidence values corresponding to the first measurement for at least some of the lobes based on non-binary membership functions; and refining the portion of the reflectance signal based on at least one formula for processing values in the set of values.

32. The method of claim 31 wherein determining includes the steps of determining a height of each lobe in the set of lobes, determining the relative distance of each lobe in the set of lobes from minimum and maximum values, and determining a width of each lobe in the set of lobes; and wherein applying includes producing for each lobe a set of height, width and distance values.

33. The method of claim 31 wherein refining includes combining at least one of the lobes with an adjacent lobe in the set of lobes.

34. The method of claim 31 wherein refining includes combining at least one of the lobes with an adjacent lobe in the set of lobes if a resulting combined lobe is a valid element width based on an X-dimension size of the data collection symbol.

35. The method of claim 31 wherein applying includes comparing the set of lobes to a series of curves to derive degrees of confidence, and wherein the degrees of confidence correspond to linguistic height or width variables.

* * * * *